United States Patent
Mani

(10) Patent No.: US 7,503,621 B2
(45) Date of Patent: Mar. 17, 2009

(54) CRUSHABLE ARMREST AND PELVIC STRUCTURES FOR MOTOR VEHICLE SIDE IMPACTS

(76) Inventor: Ayyakannu Mani, 5346 Hertford, Troy, MI (US) 48085-3274

( * ) Notice: Subject to any disclaimer, the term of this patent is extended or adjusted under 35 U.S.C. 154(b) by 0 days.

(21) Appl. No.: 11/737,471

(22) Filed: Apr. 19, 2007

(65) Prior Publication Data

US 2007/0246925 A1    Oct. 25, 2007

Related U.S. Application Data

(63) Continuation-in-part of application No. 11/190,693, filed on Jul. 26, 2005.

(60) Provisional application No. 60/793,840, filed on Apr. 20, 2006.

(51) Int. Cl.
    *B60J 7/00*    (2006.01)
(52) U.S. Cl. .................................. 296/187.05; 226/153

(58) Field of Classification Search ............ 296/187.05, 296/153; 280/751, 748; 297/411.21; 248/118; 188/371, 377
See application file for complete search history.

(56) References Cited

U.S. PATENT DOCUMENTS

| | | | | |
|---|---|---|---|---|
| 3,400,979 A | * | 9/1968 | Ivor | 297/411.21 |
| 5,527,084 A | * | 6/1996 | Scherf | 296/153 |
| 5,857,734 A | * | 1/1999 | Okamura et al. | 296/187.12 |
| 6,893,077 B1 | * | 5/2005 | DeJongh | 296/187.05 |
| 7,121,611 B2 | * | 10/2006 | Hirotani et al. | 296/146.7 |

* cited by examiner

*Primary Examiner*—Joseph D Pape
(74) *Attorney, Agent, or Firm*—John R. Benefiel

(57) ABSTRACT

An armrest which is sufficiently sturdy to support vertical loads but is deformable when a side impact collision occurs so as to avoid injury to an occupant. In one embodiment, a top platform pivots up when a supporting trim panel section is collapsed and a crush cell structure is collapsed under a side impact condition. In another embodiment, a cover molding encloses the crush cell structure is crushable with the structure in a side impact collision.

13 Claims, 8 Drawing Sheets

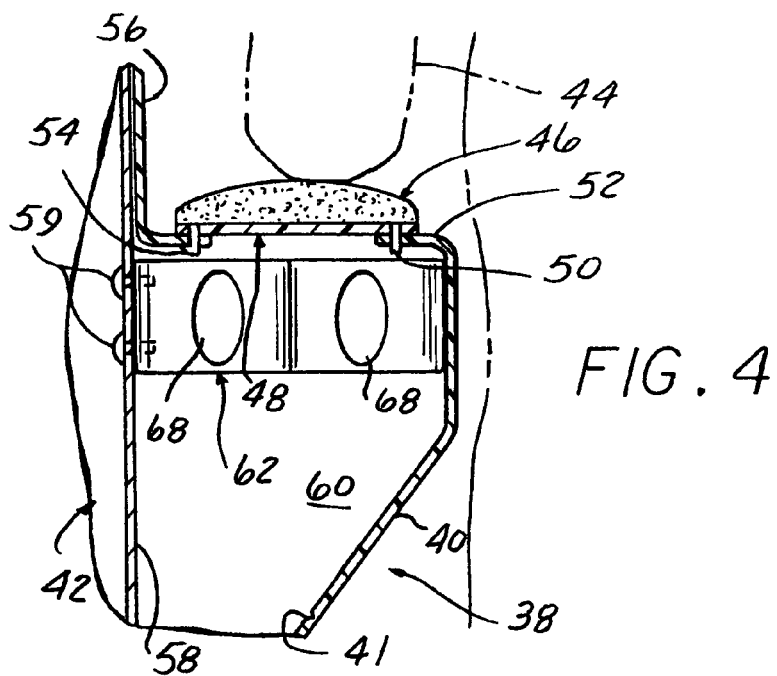
FIG. 4
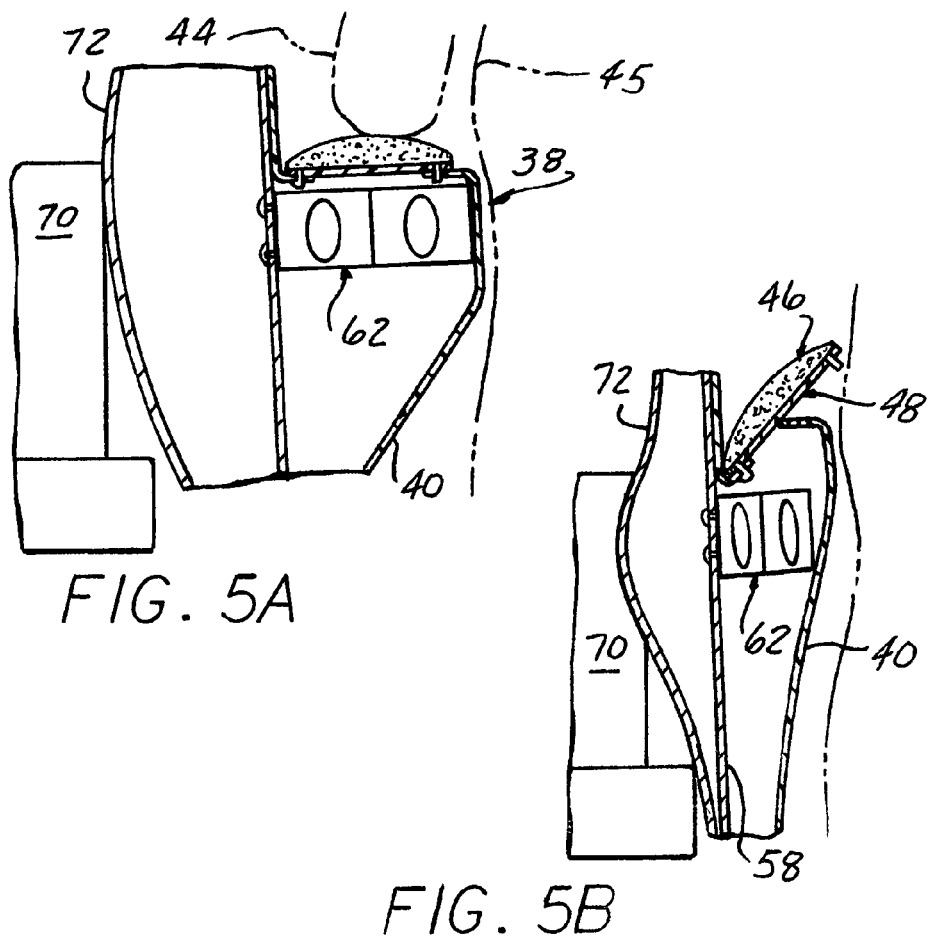
FIG. 5A
FIG. 5B

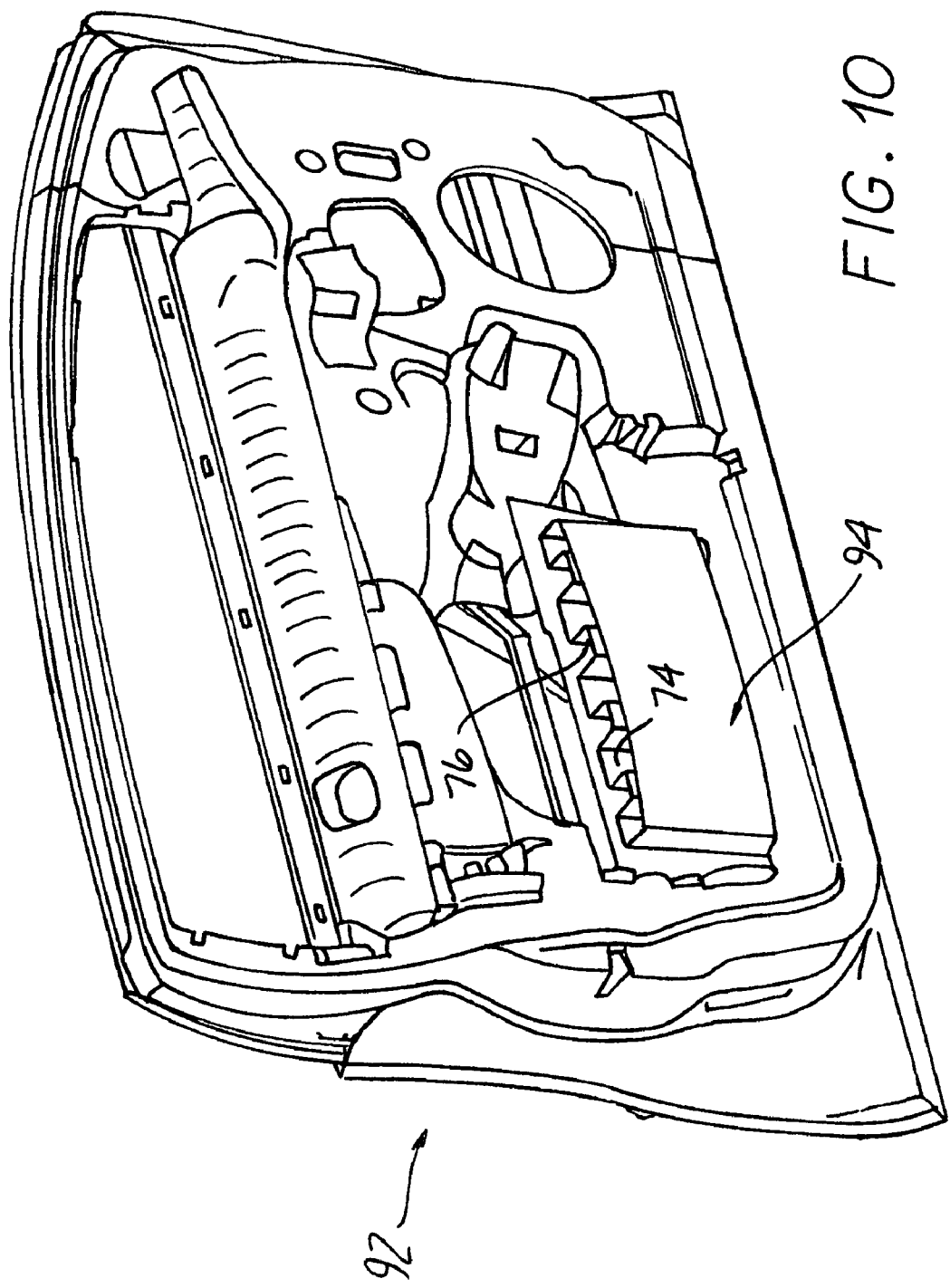

CRUSHABLE ARMREST AND PELVIC STRUCTURES FOR MOTOR VEHICLE SIDE IMPACTS

CROSS REFERENCE TO RELATED APPLICATIONS

This application claims the benefit of U.S. provisional application No. 60/793,840 filed on Apr. 20, 2006. This application is a continuation in part of U.S. application Ser. No. 11/190,693 filed on Jul. 26, 2005.

BACKGROUND OF THE INVENTION

In a side impact collision, where a vehicle is hit from the side by another vehicle, the impact is typically taken by the front and rear doors and the body structure surrounding the doors. An arm rest structure on the inside of the vehicle doors is primarily provided as a convenience feature to support one arm of each of the occupants. Typically, the armrest structure is padded on the outside with foam for comfort and has interior structure such as one or more brackets to provide substantial vertical stiffness to support service and abuse loads (such as in the extreme case of someone standing on the armrest to access the roof). The arm rest must also have enough lateral stiffness to enable opening and closing of the door using a door handle incorporated in the arm rest. The armrest should also have sufficient fatigue strength to withstand the repeated door openings and closings over the life of the vehicle. To satisfy these requirements, the armrest ends up being a very stiff structure that does not crush easily so that forcible contact with an occupant's abdomen will result in internal injuries to the occupant in the event of a side impact crash.

Such deformable armrests have heretofore been proposed, as for example in U.S. Pat. Nos. 6,893,077 and 5,951,094.

To cushion the pelvis during such a side impact crash, a foam block is typically placed between the door trim panel and the door inner panel. However, foam suffers from several disadvantages such as a "stack-up" load increase after about 50% to 60% of foam compression due to foam cell wall flattening. Typically there also is degradation of foam material properties over time and at high temperature (e.g., foam can become quite soft in compression at high temperatures).

It is an object of the present invention to provide a vehicle armrest which is capable of supporting substantial vertical loads while being crushable on side impact to effectively protect an occupant from injury by contact with the armrest.

It is a further object of the present invention to provide a side impact pelvic cushion which is not subject to age or temperature degradation and is effective through widely varying range of loadings.

SUMMARY OF INVENTION

The above recited objects as well as other objects which will become apparent upon a reading of the following specification and claims are achieved by an armrest assembly including a trim panel segment sloping upwardly and inwardly from the inside of the door panel forming a ledge feature which presents only moderate lateral crushing resistance combined with a crush cell structure which is crushed upon collapse of the trim panel segment towards the door inner panel. The trim panel is preweakened as with a groove pattern to as to be readily collapsed in a side impact collision. In a first embodiment of the invention, the armrest is underlain by foam on a platform slotted to be crushable in a sideways direction.

Beneath the platform disposed between the outer sloping trim panel segment and door inner panel is the crush cell structure comprised of one or more crush cells defined by thin sheet metal formed into closed figures configured to be flattened by a side impact, which structure is attached to the door inner panel and trim panel segment such as to be rigid to vertically applied loads but readily crushable by side impact loads.

The foam and foam platform compress as the crush structure is collapsed.

In a second embodiment, the support platform is overlain with a soft pad. The crush cell structure lies immediately beneath the platform which is secured in a horizontal orientation by snap fit pins which allows one side of the platform to be released from the trim panel and flipped up to a substantially vertical orientation upon outward deflection of the outer sloping panel. The crush cell structure which has its thin sheet material walls in a vertical orientation, is collapsed as the sloping outer panel is moved against the crush cell structure by contact with the occupant's body.

The crush cell structure is preferably comprised of a thin sheet material such as steel or aluminum formed into an opened ended closed shape, and with internal cells formed by webs or convolutions of the sheet material. Holes may be formed in the sheet material to more precisely achieve a desired crushing strength to absorb the impact energy while reducing the peak pressure forces imposed on the occupant's body to minimize injuries.

In another version of the crushable armrest, a thin-wall armrest cover molding is used instead of a flat armrest pad fastened to the trim panel. This molding, by being made of thin-walled material, is made to be easily crushable at low side impact loads.

The design of the crush cell structure allows for increasing stiffness at increasing distances to the rear so that crush loads going from the $5^{th}$ percentile female occupant to $95^{th}$ percentile male occupant are matched to the crush strength of the crush cell, thereby accommodating differing levels of abdominal injury thresholds. Openings in the crush cell walls can be formed at various locations to further help achieve the desired crush loads.

The cover molding is positioned close to the crush cell so that vertical loads applied on the armrest are transmitted to the crush cell which is very stiff in the vertical direction because of the vertical orientation of its walls construction. In a side impact, the impacting vehicle crushes the door outer panel and the armrest assembly easily crushes the lower torso region of the occupant makes contact with it.

In a modification of the armrest assembly, another version incorporates a "pull-cup" in the armrest cover molding. A separate door handle would not be necessary in this case. the pull cup is aligned with one of the cell openings in the crush cell. the armrest cover molding is still crushable; the "pull-cup" is crushed easily by the in-board and out-board walls surrounding it.

A pelvic crush cell structure may also be provided also comprised of a closed shaped formed of sheet material located behind the door panel located below the level at which the arm rest is disposed.

DESCRIPTION OF DRAWINGS

FIG. 4 is a transverse sectional view through a second embodiment of an arm rest according to the invention with adjacent door structure and a partial outline in phantom lines of an occupant's body.

FIG. 5A is a view of the arm rest shown in FIG. 4 with the door to which it is attached in contact with a side impacting vehicle indicated diagrammatically.

FIG. 5B is a transverse sectional view of the arm rest shown in FIG. 5A and adjacent door structure collapsed by a side impact.

FIG. 10 is a pictorial view of the inside of a motor vehicle with a pelvic crush cell installed therein located below the level of an arm rest according to the invention.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
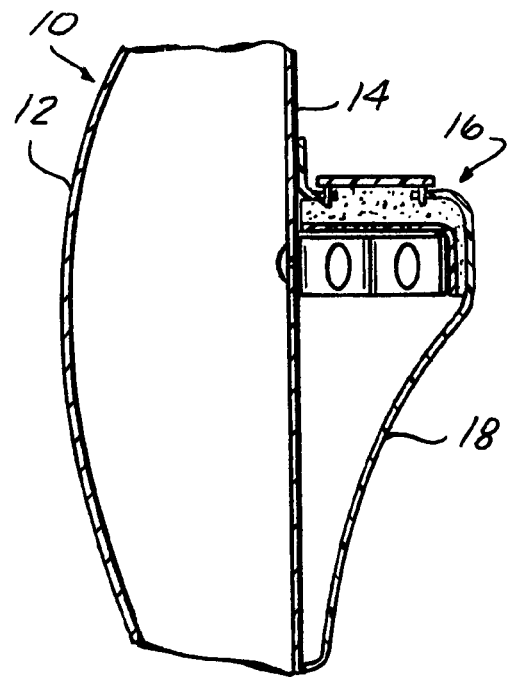
FIG. 1 is a transverse fragmentary sectional view taken through a motor vehicle door and an arm rest according to the present invention.
Figure 2:
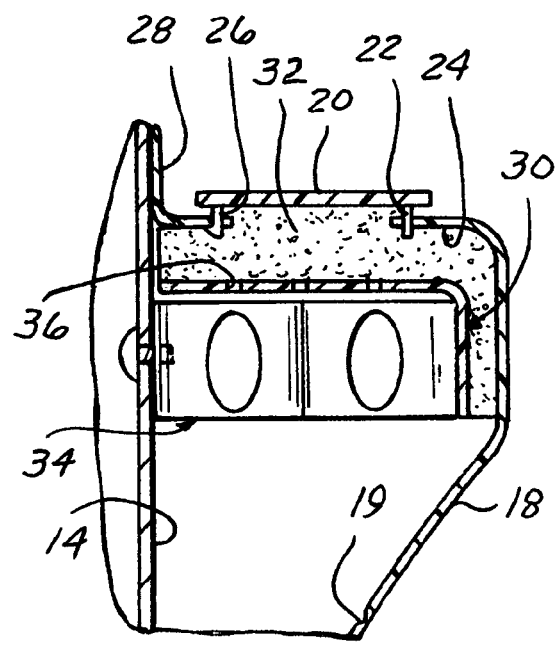
FIG. 2 is an enlarged sectional view of the arm rest shown in FIG. 1.
Figure 3:
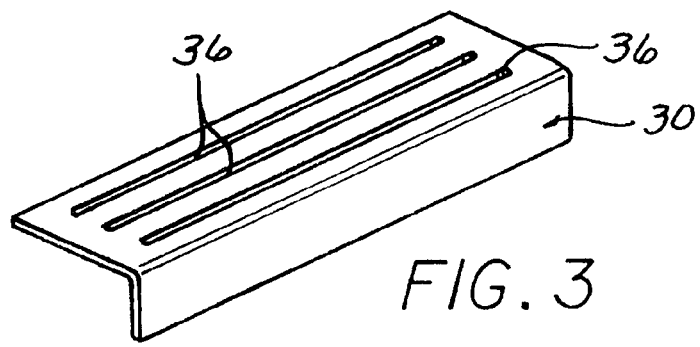
FIG. 3 is a pictorial view of a foam support bracket included in the arm rest shown in FIGS. 1 and 2.

Referring to the drawings and particularly FIG. 1 a fragmentary motor vehicle door 10 is depicted in simplified form with an exterior panel 12 and an interior panel 14.

An arm rest assembly 16 according to the invention includes an upwardly and outwardly curving molded plastic trim panel 18 forming a ledge or step at a level convenient for resting the forearm of the vehicle occupant. Mounted atop that ledge is a support platform 20 having snap fit pins 22 inserted in an inwardly turned lip 24 on the trim panel 18.

A second set of pins 26 are inserted in a trim strip 28 extending into the door inner panel 14.

An L-shaped foam retention bracket 30 is disposed spaced below the platform 20, with the intervening space filled with cushioning foam material 32.

Disposed below the bracket 30 is a crush cell structure 34 attached along one side to the outside of the door inner panel 14 and the other side to the inside of the bracket 30.

The bracket 30 has slots 36 extending along its length to allow lateral crushing at moderate loads.

The trim panel segment 18 may have a U-shaped preweakening notch pattern 19 to make lateral movement, as will be described, easier in a crash. The crush cell structure 34 is an open ended closed figure formed from sheet material into shapes such as seen in FIGS. 7A, 7B, and 9A-9E.

FIG. 4 depicts a preferred form of an arm rest assembly 38 in which an upwardly and inwardly extending trim panel section 40 forms a ledge an the inside of a vehicle door 42 at a level convenient for resting thereon of the elbow and forearm 44 of an occupant.

The ledge is covered with a cushioned pad 46 supported on a rigid platform 48 attached above one side with pins 50 which are snap fit into holes in an inturned lip 52 at the top edge of the trim panel 40. The other side is attached with snap fit pins 54 inserted in a turned out edge of a trim strip 56 secured to the inner panel 58 of the door 42.

The trim panel 40 may have a preweakening notch pattern 41 formed therein at a location intermediate its height to aid in bending thereof in a side impact event described below.

Mounted just below the platform 48 and in the space 60 formed between the door inner panel 58 and the inside of the trim panel 40 is a crush cell structure 62, attached to door inner panel 58 with suitable fasteners 59.

Figure 7A:
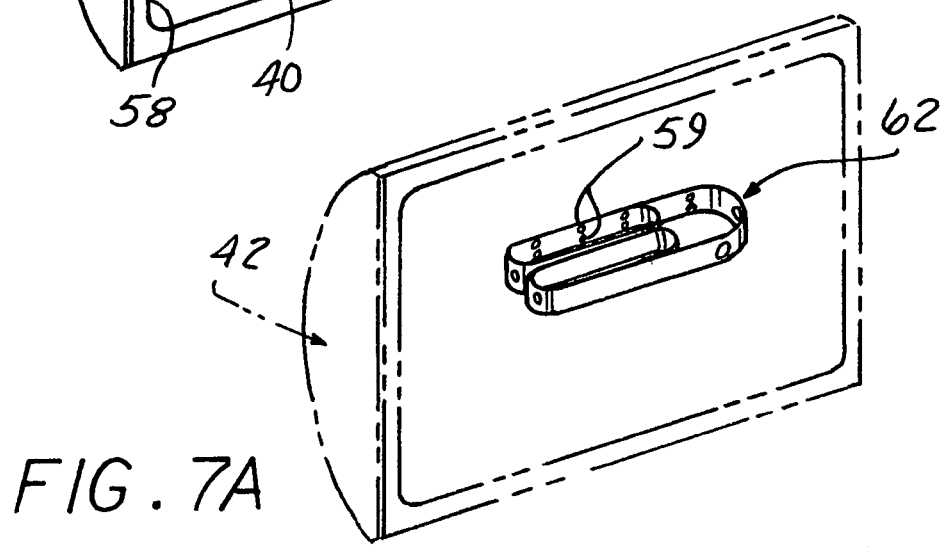
FIG. 7A is a pictorial view of a vehicle door shown in outline in phantom lines with the crush cell included in the armrest shown in isolation.
Figure 7B:
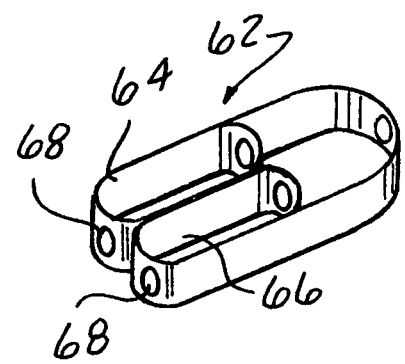
FIG. 7B is an enlarged pictorial view of a crush cell which may be incorporated in an armrest according to the invention.

The crush cell 62 is preferably of a configuration shown in FIGS. 7A and 7B in which a thin sheet material (such as steel) is formed into a closed shape. A plurality of inner cells 64, 66 may be included as well as openings 60 to produce a desired crushing strength of the crush cell 62. This configuration provides a predictable substantially uniform crushing resistance a substantial range of crushing collapse motion to be an effective energy absorber as described in the parent U.S. patent application as well as U.S. Pat. No. 7,128,339, incorporated by reference herein.

FIG. 5A shows a side impacting vehicle diagrammatically 70, in contact with an outer door panel 72. An occupant torso is represented in outline at 45 and his or her forearm at 44.

As the outer panel collapses, the trim panel 40 moves towards the inner door panel under pressure exerted by the occupant's torso. The platform 48 is tipping up to not present any resistance to collateral collapse of the remaining structure. The outward movement of the trim panel section 40 causes crushing of the crush cell structure 62 as shown, effectively absorbing energy without exerting injurious levels of pressure on the occupant's body.

Figure 6:
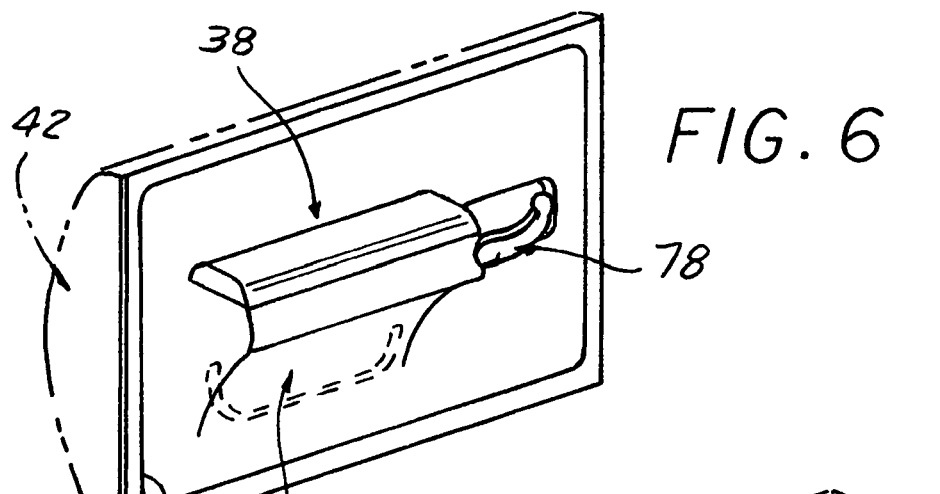
FIG. 6 is a pictorial view of a vehicle door depicted in outline in phantom lanes and showing an armrest according to the invention with a door handle attached.

FIG. 6 shows that the trim panel section 40 may be a sculpted section of the door inner panel, with a door handle 78 attached to the arm rest 38.

Figure 8A:
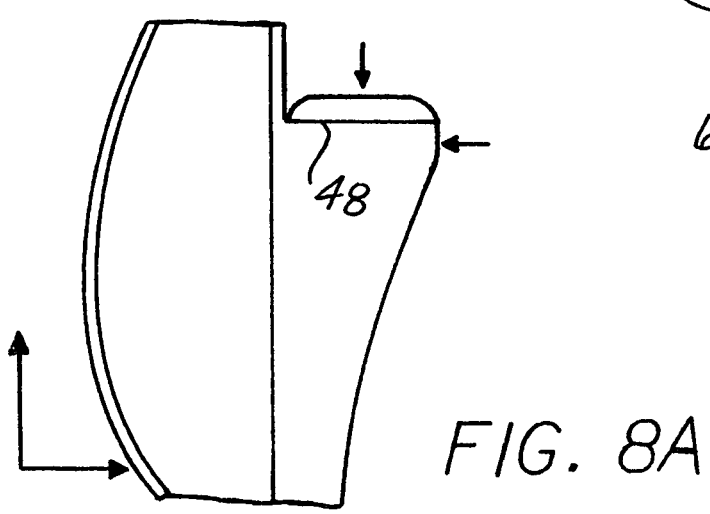
FIG. 8A is a diagrammatic view of the armrest shown in FIG. 4 with the direction of the forces which may be applied to the arm rest assembly indicated with arrows.

FIG. 8A shows that the arm rest assembly presents a stiffness in a vertical direction capable of supporting heavy loads, with the walls of the crushable cell structure 62 oriented for maximum stiffness to down loadings by being vertically oriented.

In the horizontal direction, the flip up action of the rigid platform 48, the hinging action of the trim panel section 40, and the predictable, substantially uniform crushability of the crush cell structure 62 provide energy absorption in the horizontal direction reducing peak pressure on the occupant's lower torso.

Figure 11A:
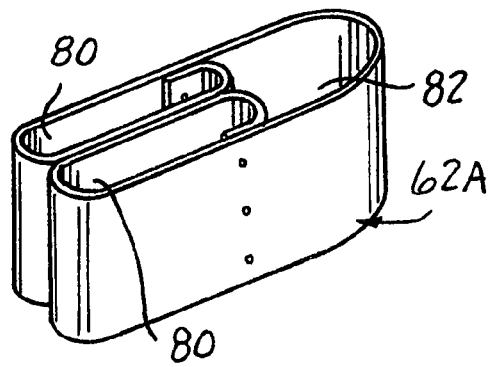
FIGS. 11A and 11B are pictorial views of two differing pelvic crush cells which may be provided in a motor vehicle door in combination with an arm rest assembly according to the invention.
Figure 11B:
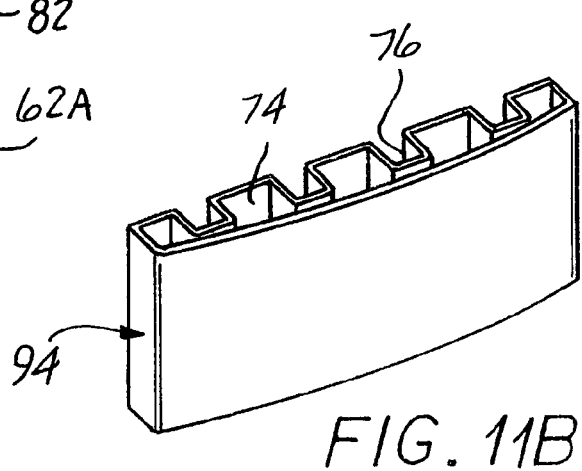

FIGS. 9A-9E show various forms of the crush cell structure 62A-62E. Crush cell structure 62A (also shown in FIG. 11A) is formed from a single strip of sheet material (preferably steel) looped into a pair of inner cells 80 having parallel sides and with the parallel sides rounded at each end, with a larger cell 82 founded at one end formed when the inner cells 74 are abutted together to present a stiffer structure at one end.

Figure 9A:
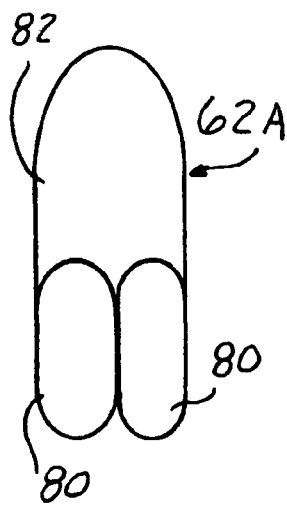
FIGS. 9A-9E are top views of various configurations of the crush cells which may be incorporated in the arm rest according to the invention.
Figure 9B:
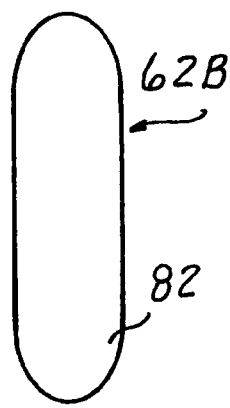

FIG. 9B shows a single cell crush cell structure 62B formed of a strip of sheet material into parallel sides and rounded ends.

Figure 9C:
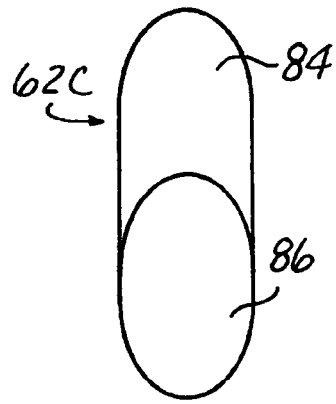

FIG. 9C shows a crush cell structure 62C with one large cell 84 and a larger inner cell 86.

Figure 9D:
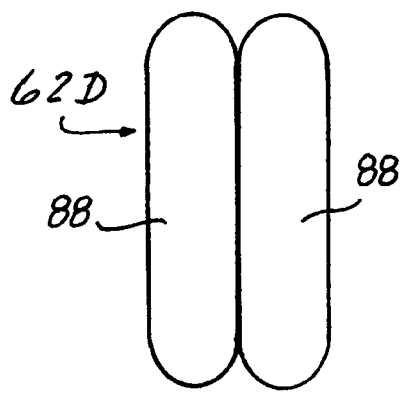

FIG. 9D shows a crush cell structure 62D with a pair of side by side cells 88 joined together.

Figure 9E:
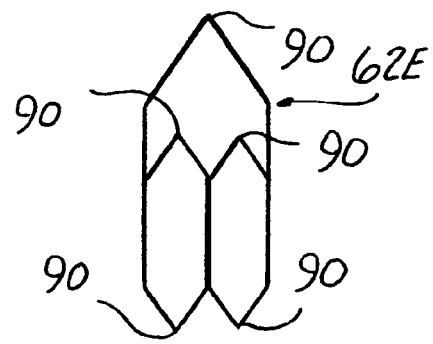

FIG. 9E shows a crush cell structure 62E in which angled corners 90 of three cells create an accordion like individual cells for reduced crush resistance.

It should be understood that the crush resistance is a function of the material, the sheet thickness as well as the overall shape of the crush cell structures, and these may be adjusted to obtain a desired stiffness and crushability.

FIG. 10 shows a motor vehicle door 92 in which a pelvic crush cell structure 94 is installed against the outer door panel at a lower level than the armrest. The crush cell structure 94 may also be made of sheet metal formed into cells such as the channel shapes shown. The crush cell structure 62D or other similar configurations may also be employed.

Figure 8B:
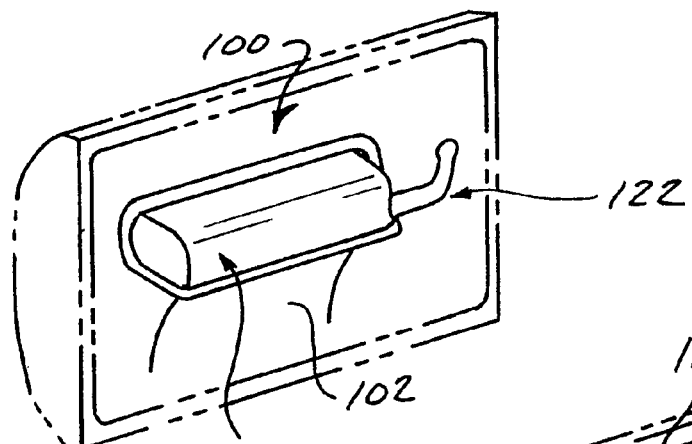
FIG. 8B is a pictorial view of another embodiment of an armrest assembly according to the present invention with adjacent door structure shown in phantom lines.
Figure 8C:
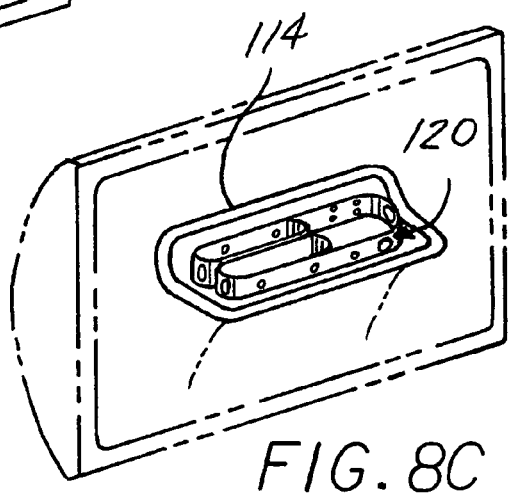
FIG. 8C is a pictorial view of the armrest assembly shown in FIG. 8B with a cover molding removed to reveal the crush cell assemblage mounted therewithin.
Figure 8D:
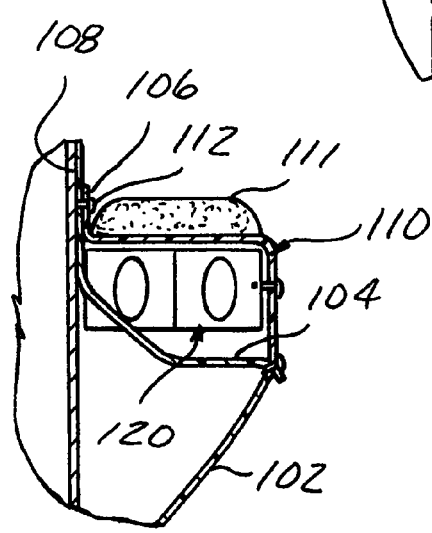
FIG. 8D is an endwise sectional view taken through the armrest assembly shown in FIGS. 8B and 8C with adjacent structure.

FIGS. 8B-8B shows another variation of an armrest assembly according to the invention. This armrest assembly 100 includes a trim panel 102 shaped to produce a horizontal ledge 104, with an upturned upper end 106 affixed to a door inner panel 108. A cover molding 110 enclose a region above the ledge 104, having a peripheral flange 112 abutting a flange 114 on the trim panel 102 extending around the ledge 104. A hole can be cut into the ledge wall 118 allowing a crush cell structure 120 to be fixedly mounted in the space enclosed by the cover molding 110. A cushioned pad 122 is mounted to the top of the cover molding 110.

The cover molding 110 is designated to be crushable by horizontally applied forces by having thin walls (2 or 3 mm thick) of a suitable plastic such as vinyl.

The stiffness of the crush cell structure 120 in vertical directions reinforces the cover molding in that direction.

A handle 122 can be included attached to the armrest assembly 100 at an end and to the trim panel wall 106 at the other end.

Figure 8E:
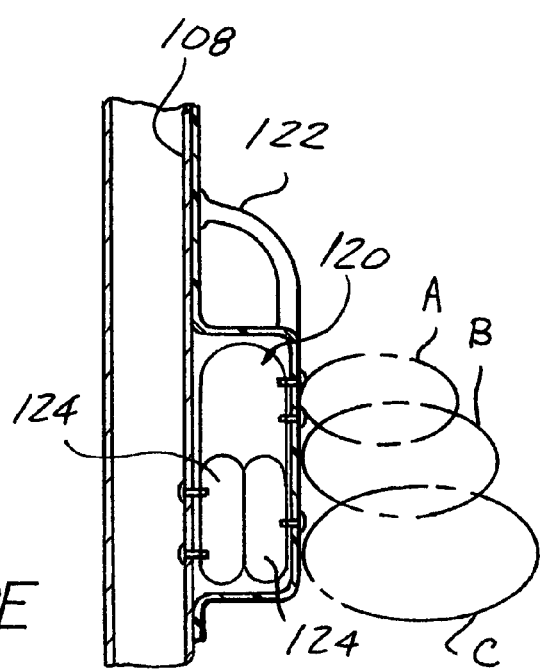
FIG. 8E is a horizontal sectional view of the armrest assembly shown in FIGS. 8B-8D.
Figure 8F:
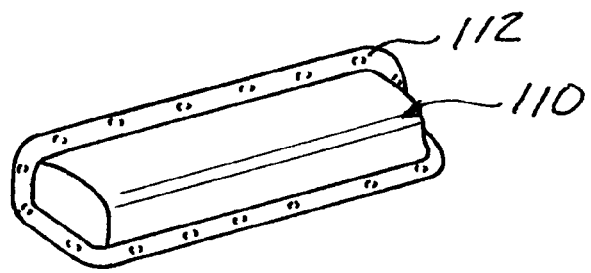
FIG. 8F is a pictorial view of a thin wall cover molding included in the armrest assembly showing FIGS. 8B-8E.

FIG. 8E shows that the crush cell structure 120 can be made stiffer at its rear end by including more interval cells at the rear end. This creates better matching to the $5^{th}$ percentile female A, the $50^{th}$ percentile male B and the $95^{th}$ percentile male C.

Figure 8G:
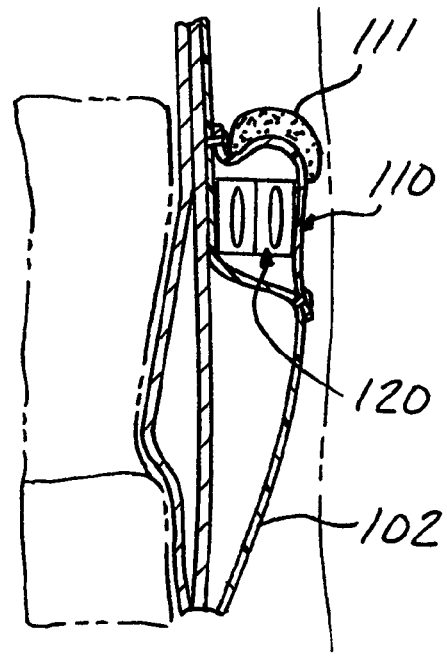
FIG. 8G is a side sectional view of the armrest assembly after side impact by a vehicle shown diagrammatically.
Figure 8H:
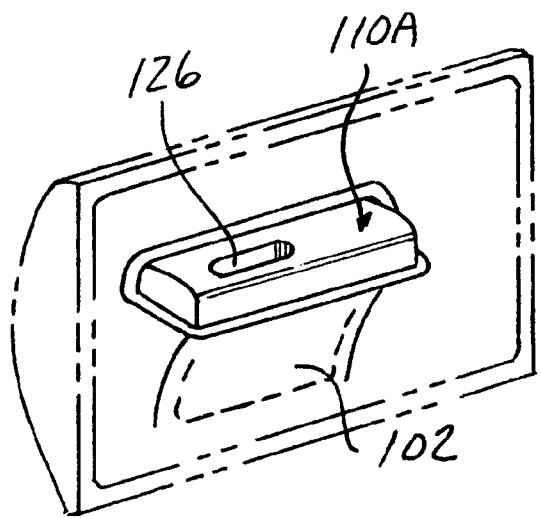
FIG. 8H is a pictorial view of another version of the armrest assembly shown in FIGS. 8B-8E installed on a vehicle door.
Figure 8I:
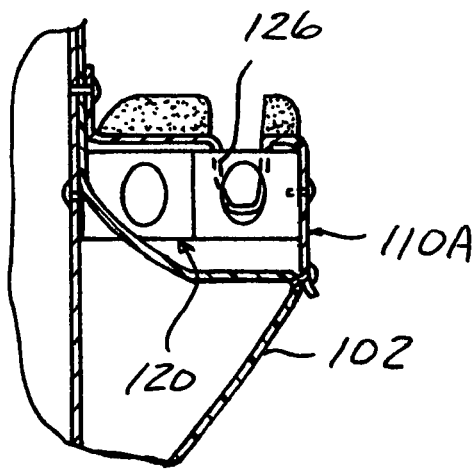
FIG. 8I is a side sectional view of the armrest assembly shown in FIG. 8H with adjacent door structure.
Figure 8J:
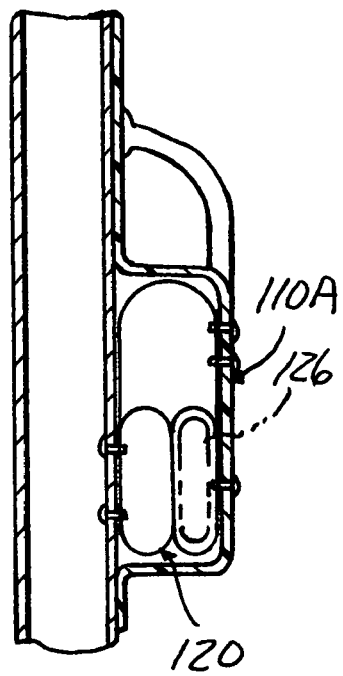
FIG. 8J is a horizontal sectional top view of the armrest assembly shown in FIGS. 8H and 8I.
Figure 8K:
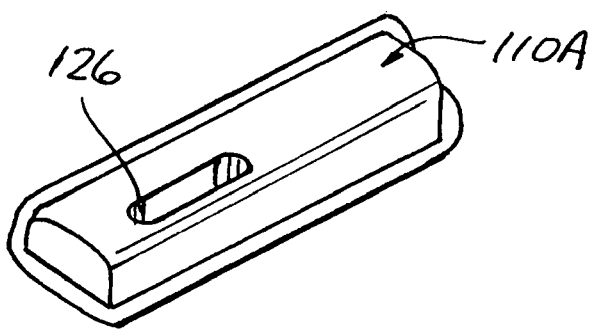
FIG. 8K is a pictorial view from the outside of a cover molding included in the armrest assembly shown in FIGS. 8H-8J.
Figure 8L:
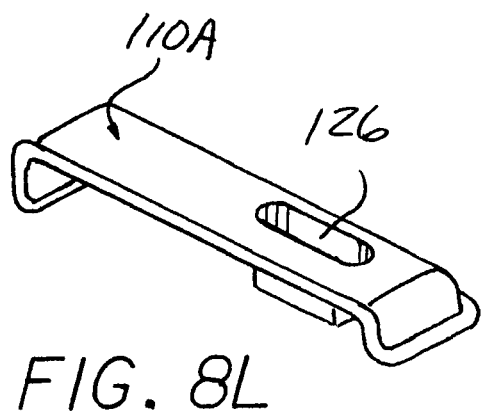
FIG. 8L is a pictorial view from the inside of the cover molding shown in FIG. 8K.

FIG. 8G shows a impact induced collapse of the armrest assembly 100 with the cover molding 110, crush cell structure 124 and trim panel 102 all flattened towards the door inner panel 108.

FIGS. 8I-8L show a variation in which a pull cup 126 is formed into the cover molding 110A which is attached to the trim panel 102. The pull cup 126 is formed integrally with the molding cover 110A and projects downwardly where it is aligned with one of the inner cells 126 to be received therein. This eliminates the need for a separate handle 122.

The invention claimed is:

1. An armrest assembly in combination with a motor vehicle door having an door inner panel and an exterior panel separated to form a space therebetween, said armrest projecting inwardly into a vehicle interior from said door inner panel;

a crush cell structure including an open ended closed figure shape having a thin metal wall;

a trim panel segment sloping upwardly and inwardly from said door inner panel and an armrest ledge formed at least in part by said trim panel segment;

said crush cell structure mounted behind said trim panel segment and beneath said armrest ledge, said crush cell structure having walls oriented vertically to provide vertical stiffness to support said armrest ledge while being crushable in a sideways direction; and said crush cell structure collapsed when said trim panel is collapsed towards said door inner panel;

said trim panel segment spaced in from the door inner panel at a top portion thereof with a horizontal plate mounted extending from said top portion to said door inner panel, said plate releasably mounted to move a side of said plate adjacent to said trim panel segment upwardly to bring said plate to a substantially vertical position upon collapse of said trim panel segment towards said door inner panel.

2. The combination according to claim 1 wherein a cushioned pad is mounted on said plate.

3. The combination according to claim 1 wherein an interior cell is formed within a larger outer cell of said crush cell structure.

4. The combination according to claim 1 wherein said crush cell structure is formed with sharply angled corners to provide an accordion type collapse thereof.

5. The combination according to claim 1 wherein one or more interior webs are provided in said crush cell structure creating internal crush cells.

6. The combination according to claim 1 wherein foam material is disposed under said plate and atop a sideways crushable support.

7. The combination according to claim 1 further including a pelvic crush cell located below said armrest and between said door inner and outer panels.

8. The combination according to claim 1 wherein said trim panel segment is pre-weakened to assist in collapsing movement of said trim panel segment towards said door inner panel.

9. The combination according to claim 1 wherein said plate mounting comprises a separable connection fixing an other side of said plate and said trim panel segment together.

10. An armrest assembly in combination with a motor vehicle door having an interior wall panel and an exterior panel separated to form a space therebetween, said armrest projecting inwardly into a vehicle interior from said door inner panel;

a crush cell structure including an open ended closed figure shape having a thin metal wall;

a trim panel segment sloping upwardly and inwardly from said door interior panel and an armrest ledge formed at least in part by said trim panel segment;

said crush cell structure collapsed when said trim panel is collapsed towards said door inner panel;

said crush cell structure having curved ends with holes formed in said curved ends.

11. An armrest assembly in combination with a motor vehicle door having an interior wall panel and an exterior panel separated to form a space therebetween, said armrest projecting inwardly into a vehicle interior from said door inner panel;

a crush cell structure including an open ended closed figure shape having a thin metal wall;

a trim panel segment sloping upwardly and inwardly from said door interior panel and an armrest ledge formed at least in part by said trim panel segment;

said crush cell structure collapsed when said trim panel is collapsed towards said door inner panel;

said armrest assembly including a thin walled crushable cover molding resting on said armrest ledge enclosing said crush cell structure, said cover molding and said crush cell structure collapsed as said trim panel segment is collapsed towards said door inner panel.

12. The combination according to claim 11 wherein a pull cup extending is provided below said cover molding and into said crush cell structure.

13. A method of reorienting an armrest for a motor vehicle door when a side impact occurs comprising releasably mounting a platform to extend substantially horizontally from a door inner panel so as to provide an armrest and to be tilted up to be disposed vertically when said door is impacted from the side; and mounting a crush cell structure beneath said platform configured with an opened ended closed figure formed by thin metal walls oriented vertically to easily collapse upon impact from the side when a trim panel segment extending out beneath said platform is collapsed towards said door inner panel, but provide a stiff support for said platform.

* * * * *